US005493696A

United States Patent [19]
Wolf

[11] Patent Number: 5,493,696
[45] Date of Patent: Feb. 20, 1996

[54] METHOD FOR LOCATING A SUBSCRIBER UNIT THAT IS IN CLOSE PROXIMITY TO A REQUESTING SUBSCRIBER UNIT IN A WIDE AREA COMMUNICATION SYSTEM

[75] Inventor: Herbert R. Wolf, Crystal Lake, Ill.

[73] Assignee: Motorola, Inc., Schaumburg, Ill.

[21] Appl. No.: 251,557

[22] Filed: May 31, 1994

[51] Int. Cl.⁶ ................................................ H04Q 7/28
[52] U.S. Cl. ................................. 455/56.1; 455/54.2
[58] Field of Search ............................ 455/56.1, 53.1, 455/54.1, 54.2, 57.1, 58.1, 34.1, 99, 100

[56] References Cited

U.S. PATENT DOCUMENTS

| | | | |
|---|---|---|---|
| 4,112,257 | 9/1978 | Frost | 455/54.2 X |
| 5,313,652 | 5/1994 | Rozenstrauch et al. | 455/56.1 X |
| 5,369,783 | 11/1994 | Childress et al. | 455/56.1 X |
| 5,396,644 | 3/1995 | Tzidon et al. | 455/54.2 X |

*Primary Examiner*—Reinhard J. Eisenzopf
*Assistant Examiner*—Philip J. Sobutka
*Attorney, Agent, or Firm*—Nedra D. Karim; Daniel C. Crilly

[57] ABSTRACT

In a wide area communication system that includes a central controller, a plurality of sites, and a plurality of subscriber units, a requesting subscriber unit can locate a neighboring subscriber unit in the following manner. Each of the plurality of subscriber units registers with the central controller. The central controller stores registration information in a database. When the requesting subscriber unit transmits a request for a subscriber identification of a neighboring subscriber unit, the central controller determines whether the neighboring subscriber unit exists. When the neighboring subscriber unit exists, the central controller transmits the subscriber identification of the neighboring subscriber unit to the requesting subscriber unit.

27 Claims, 3 Drawing Sheets

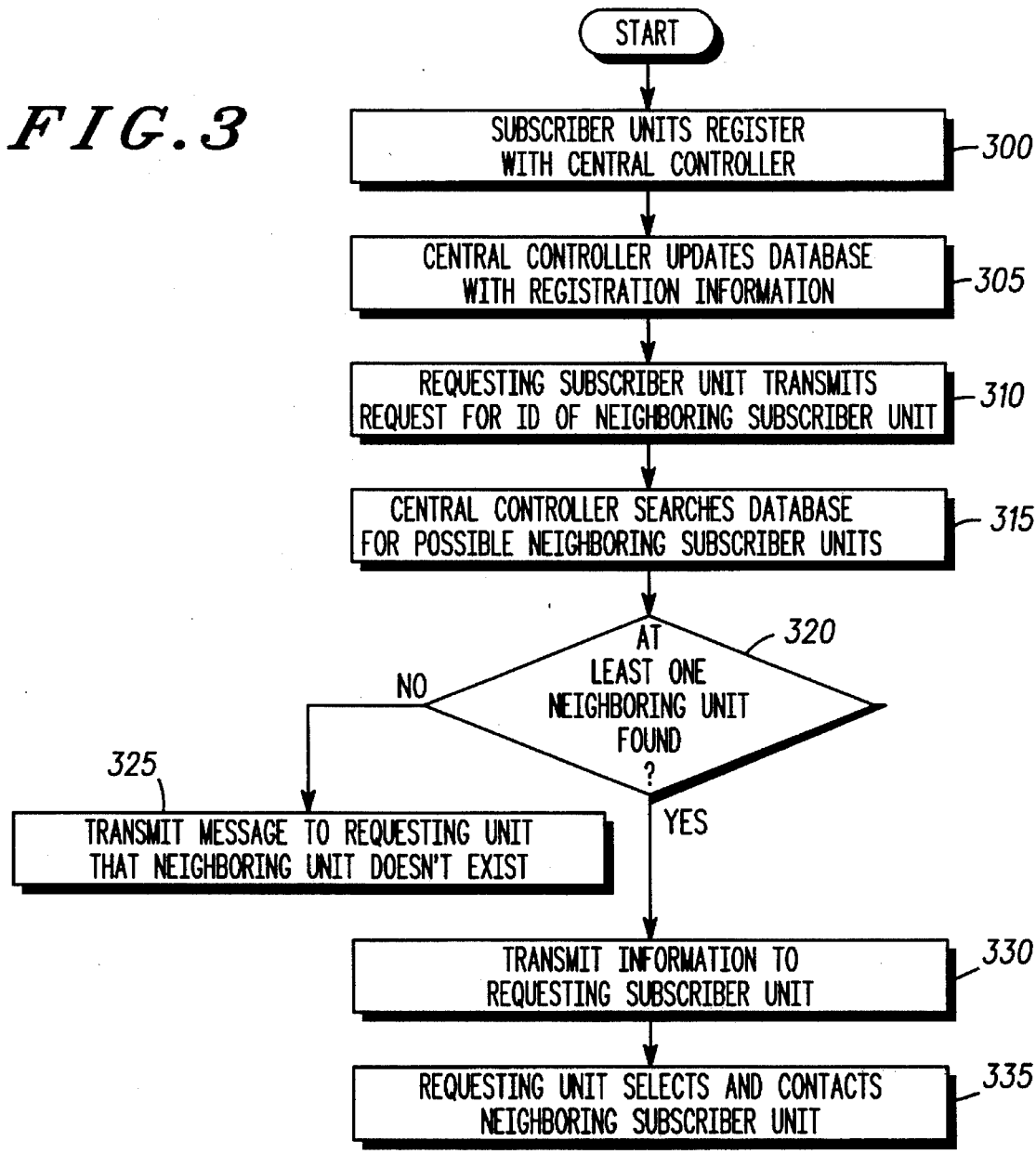

METHOD FOR LOCATING A SUBSCRIBER UNIT THAT IS IN CLOSE PROXIMITY TO A REQUESTING SUBSCRIBER UNIT IN A WIDE AREA COMMUNICATION SYSTEM

FIELD OF THE INVENTION

This invention relates generally to wide area communication systems and, in particular, to locating a neighboring communication unit of a requesting communication unit in the wide area communication system.

BACKGROUND OF THE INVENTION

Wide area communication systems are known to comprise a central controller, a plurality of remote sites, a plurality of subscriber units, a plurality of repeaters and site controllers, a plurality of remote site communication links, and a plurality of communication resources. Wide area communication systems are controlled by the central controller, which is connected to each remote site by the remote site links. The central controller processes each call request from subscriber units received by the site controllers and allocates communication resources for the call at each site that needs to be included in the call. In addition, the central controller maintains a status of each subscriber unit and the subscriber unit's functional capabilities.

When a subscriber unit is affiliated with a remote site in the wide area communication system, the user of the subscriber unit is not aware of other users within close proximity that are available for communication and/or assistance purposes. Presently, if the user of the subscriber unit needed physical assistance, the user would have to either make a private call to each known user in the system one at a time to find out their location or the user needing assistance would have to make a group call to each known talkgroup to find the location of affiliated users in the wide area system. While these methods work, they are very time consuming and inefficient.

Therefore, a need exists for a method that provides a user of a subscriber needing assistance to identify a user of a subscriber unit in the wide area communication system that is in close proximity that is efficient and has a quick response time.

BRIEF DESCRIPTION OF THE DRAWINGS

FIG. 3 illustrates a logic diagram that may be used to implement the present invention.

DESCRIPTION OF A PREFERRED EMBODIMENT

Generally, the present invention provides a method for identifying a neighboring subscriber unit of a requesting subscriber unit. This is accomplished by retrieving registration information of neighboring subscriber units and transmitting this information to the requested subscriber unit. The registration information is transmitted to the central controller by each subscriber unit upon affiliation or de-affiliation with a site of the communication system. The registration information is stored in a database controlled by the central controller. When the requesting subscriber unit requests identification information of one or more neighboring subscriber units, the central controller matches the request, based on the site of the requesting subscriber unit, with the database entries and transmits a response to the requesting subscriber unit based on the database entries.

Figure 1:
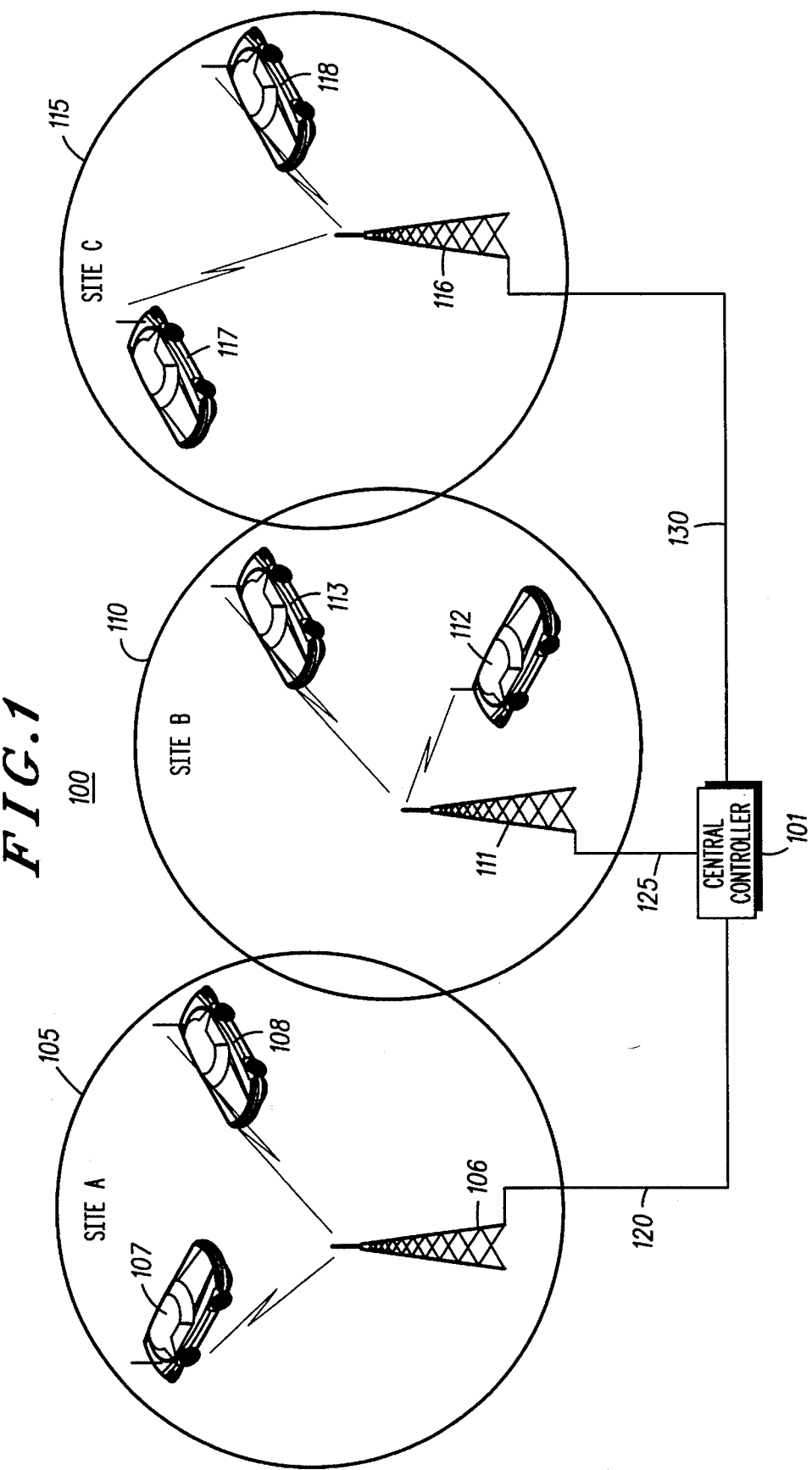
FIG. 1 illustrates a wide area communication system in accordance with the present invention.

The present invention can be more fully described with reference to FIGS. 1–3. FIG. 1 illustrates a wide area communication system (100) that includes a central controller (101), a plurality of remote sites (105, 110, 115) (three shown), and remote site links (120, 125, 130). Each remote site (105, 110, 115) comprises a repeater, including a site controller, (106, 111, 116), a plurality of subscriber units (107, 108, 112, 113, 117, 118) (six shown), and a limited number of communication resources.

Figure 2:
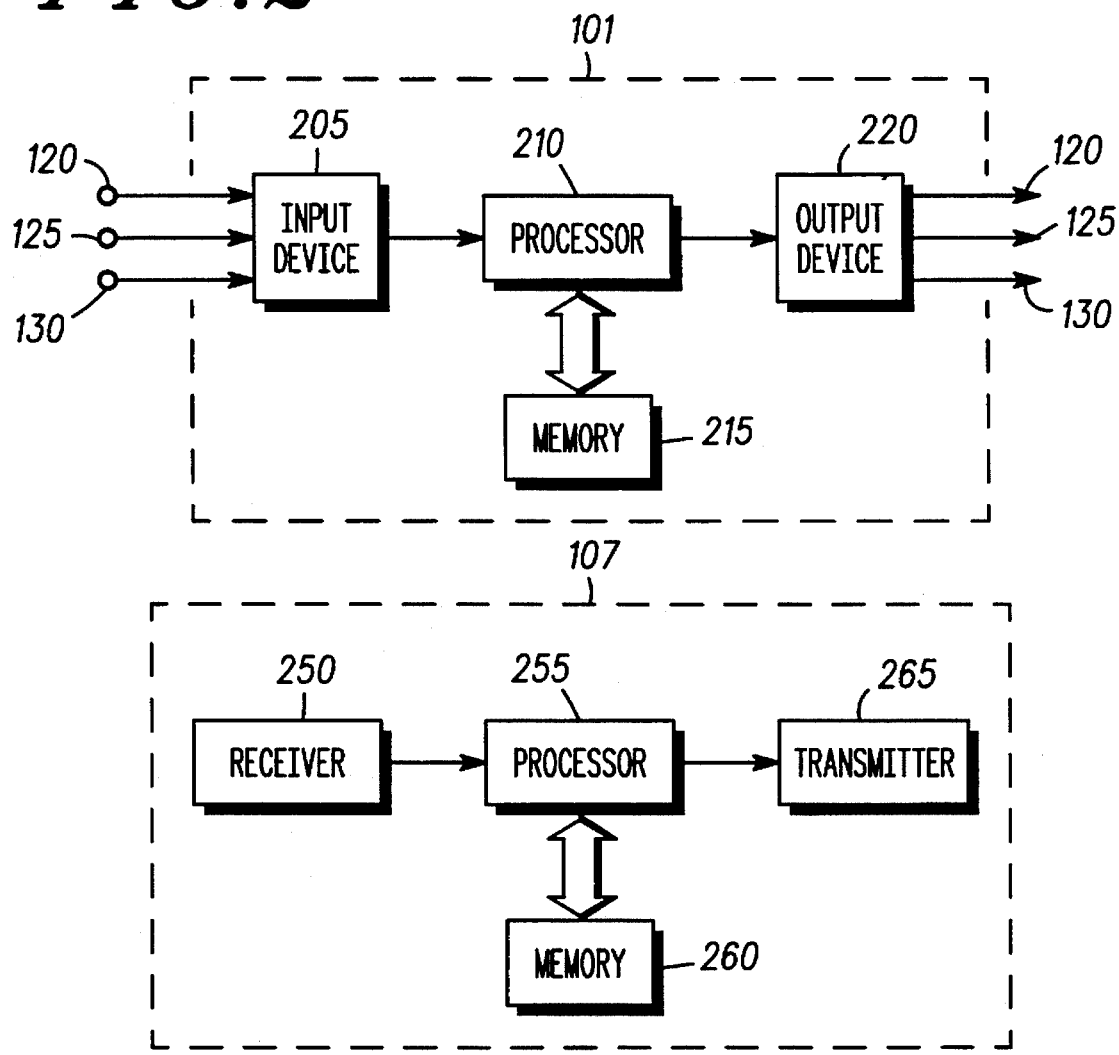
FIG. 2 illustrates a block diagram of a central controller and a subscriber unit in accordance with the present invention.

FIG. 2 illustrates a block diagram of the central controller (101) and the subscriber unit (107) in accordance with the present invention. The central controller (101), which may be a Smartnet AMSS controller or a SmartZone wide area controller, comprises an input device (205), a processor (210), memory (215), and an output device (220). Each subscriber unit (107), which may be a portable radio, such as, a Motorola Jedi or a Motorola Saber, or may be a mobile radio, such as, a Motorola Spectra radio, comprises a receiver (250), a processor (255), memory (260), and a transmitter (265). The memory elements (215, 260) may be RAM, ROM, or any type of digital information storage device. The processing devices (210, 255) may be a microprocessor such as a Motorola 68040.

Wide area communication systems are controlled by the central controller (101), which is connected to each remote site (105, 110, 115) by remote site links (120, 125, 130). The central controller (101) processes each call request from subscriber units (107, 108, 112, 113, 117, 118) received by the site controllers (106, 111, 116) and allocates channels (communication resources) for calls at each site which needs to be included in the call. In addition, the central controller (101) maintains a status of each subscriber radio unit and the subscriber radio unit's capabilities.

FIG. 3 illustrates a logic diagram that may be used to implement the present invention. At step 300, subscriber units register with the central controller either upon activation of the subscriber radio unit, upon entering the coverage area of a remote site or upon selecting a different talkgroup. The subscriber unit sends registration information over a control channel to the remote site which, passes the information to the central controller over the remote site link. This registration information contains subscriber unit id, affiliation status, and talkgroup id. Site affiliation of the registering subscriber unit does not have to be included in the registration information since this information can be added to the registration information by the central controller, based on the remote site the registration information is received from, prior to storage in a database.

The central controller stores the registration information in the database (305) such that the registration information can be retrieved in an efficient way based on various types of requests. The requests may be based on an individual subscriber unit id, site id, or talkgroup id.

A requesting subscriber unit transmits a request for identification of a neighboring subscriber unit to the central controller (310). The request may be manually entered through a keypad on the requesting subscriber unit or it may be a preprogrammed function key or key sequence on the requesting subscriber unit. The request is transmitted by the requesting subscriber radio to the site controller which passes the request to the central controller via the remote site link for further processing by the central controller. The request may be to retrieve any neighboring subscriber id, a set of neighboring subscriber ids, or retrieve any neighboring subscriber unit of a particular talkgroup or a set of talkgroups. To indicate that the neighboring subscriber unit should be affiliated with a particular site, the request may specify a particular site that is the same or adjacent to the site of the requesting subscriber unit. The request may also specify multiple sites, that may include the same site as the requesting subscriber unit, that are adjacent to the site of the requesting subscriber unit.

Once the central controller receives the request, it searches its database built from registration information of subscriber units (315). The database can be searched for possible neighboring subscriber units or matches based on the specified site(s), or based on the specified talkgroup id(s). If a single match is found (320), then a message is transmitted to the requesting radio unit. If the requesting subscriber unit requested multiple neighboring subscriber units, the central controller continues to search the database and transmits a message indicating each neighboring subscriber unit to the requesting subscriber unit until no more matches are found.

If a neighboring subscriber unit based on the request does not exist, that is, no matched entries were found in the database (320), the central controller transmits a message to the requesting subscriber unit indicating that a neighboring unit does not exist (325). The message may be in the form of a reject which is sent to the site controller via the remote site link. The site controller then sends the message to the requesting subscriber unit over the control channel. The requesting subscriber unit may display and/or generate a tone to a user of the requesting subscriber unit that a neighboring subscriber unit could not be found.

If a neighboring subscriber trait is found (320), the central controller transmits information pertaining to the neighboring subscriber unit to the requesting subscriber unit (330). The central controller sends the information to the site controller via the remote site link interface which transmits the information to the requesting subscriber unit over the control channel. The requesting subscriber unit may display the information as retrieved from the central controller's database to the user of the requesting subscriber unit.

Once the requesting subscriber unit receives identification of one or more neighboring subscriber units from its request to the central controller, the user of the requesting subscriber unit has several options. The user of the requesting subscriber unit may decide that the received information is not adequate and determine to do nothing. Secondly, the user of the requesting subscriber unit may manually select one of the responses from the central controller and activate a private call or a talkgroup call to the neighboring subscriber unit(s). Further, the central controller may automatically start a private call or a talkgroup call to one of the neighboring subscriber units. The call may be initiated as soon as the requesting subscriber unit is notified of the neighboring subscriber unit(s).

The present invention provides a method for identifying a neighboring subscriber unit of a requesting subscriber unit. With such a method, a user of a requesting subscriber unit is aware of users of subscriber units that are available for communication and assistance that are physically located nearby. By sending a request to a central controller and allowing the central controller to search its database for a neighboring subscriber unit of the requesting unit, the user of the requesting unit is made aware of the neighboring unit(s) with minimal effort. In prior art systems, a user of a subscriber unit would have to either make a private call to each individual subscriber unit one at a time to find out their location or make a group call to each known talkgroup to find out each individual subscriber unit of the talkgroup's location. This prior art method proved to be both inefficient and time consuming.

I claim:

1. In a wide area communication system that includes a central controller, a plurality of sites, and a plurality of subscriber units each having a respective subscriber identification, a method of locating at least one neighboring subscriber unit, the method comprising the steps of:

registering, by the plurality of subscriber units in the wide area communication system, with the central controller, by providing registration information;

storing in a database, by the central controller, the registration information;

transmitting, by a requesting subscriber unit to the central controller, a request for a subscriber identification of at least one neighboring subscriber unit;

upon receipt of the request, determining, by the central controller, based on the request, whether the at least one neighboring subscriber unit exists; and when the at least one neighboring subscriber unit exists, transmitting by the central controller, the subscriber identification of the at least one neighboring subscriber unit, to the requesting subscriber unit.

2. The method of claim 1 further including the step of:

when the at least one neighboring subscriber unit does not exist, transmitting, by the central controller, information indicating that the at least one neighboring subscriber unit does not exist.

3. The method of claim 1 wherein the step of determining whether the at least one neighboring subscriber unit exists further includes the steps of:

searching the database for possible neighboring subscriber units based on the request;

reviewing the registration information of each registered subscriber unit; and when the registration information of at least one of the registered subscriber units indicates a possible neighboring subscriber unit, identifying the possible neighboring subscriber unit as the at least one neighboring subscriber unit.

4. The method of claim 1 further including the steps of:

upon receipt of the subscriber identification of the at least one neighboring subscriber unit, selecting, by the requesting subscriber unit, one of the at least one neighboring subscriber units to produce a selected neighboring subscriber unit; and contacting, by the requesting subscriber unit, the selected neighboring subscriber unit.

5. The method of claim 1 wherein the request specifies identification of at least one registered neighboring subscriber unit having a site affiliation that substantially matches a site affiliation of the requesting subscriber unit.

6. The method of claim 1 wherein the request specifies identification of at least one registered neighboring subscriber unit having a site affiliation that substantially matches a site affiliation of the requesting subscriber unit or a site affiliation adjacent to the site affiliation of the requesting subscriber unit.

7. The method of claim 1, wherein the registration information includes subscriber id, site affiliation, and affiliation status.

8. The method of claim 7 wherein the step of determining whether the at least one neighboring subscriber unit exists further includes the steps of:

searching the database for possible neighboring subscriber units based on the request;

reviewing the affiliation status of each registered subscriber unit; and when the affiliation status of at least one of the registered subscriber units indicates a possible neighboring subscriber unit, identifying the possible neighboring subscriber unit as the at least one neighboring subscriber unit.

9. The method of claim 7, wherein the registration information further includes talkgroup id.

10. The method of claim 9 wherein the request specifies identification of at least one registered neighboring subscriber unit having a specific talkgroup id.

11. The method of claim 9 wherein the request specifies identification of at least one registered neighboring subscriber unit having a talkgroup id that substantially matches one of a specific set of talkgroup ids.

12. In a wide area communication system that includes a central controller, a plurality of sites, and a plurality of subscriber units each having a respective subscriber identification, a method for the central controller to locate at least one neighboring subscriber unit of a requesting subscriber unit, the method comprising the steps of:

receiving registration information from registering subscriber units to produce received registration information;

storing the received registration information in a database;

receiving a request from a requesting subscriber unit, for a subscriber identification of at least one neighboring subscriber unit;

determining, based on the request, whether the at least one neighboring subscriber unit exists; and when the at least one neighboring subscriber unit exists, transmitting to the requesting subscriber unit, the Subscriber identification of the at least one neighboring subscriber unit.

13. The method of claim 12 further including the step of:

when the at least one neighboring subscriber unit does not exist, transmitting to the requesting subscriber unit, information indicating that the at least one neighboring subscriber unit does not exist.

14. The method of claim 12 wherein the step of determining whether the at least one neighboring subscriber unit exists further includes the steps of:

searching the database for possible neighboring subscriber units based on the request;

reviewing registration information of registered subscriber units; and when the registration information of at least one of the registered subscriber units indicates a possible neighboring subscriber unit, identifying the possible neighboring subscriber unit as the at least one neighboring subscriber unit.

15. The method of claim 12 further including the steps of:

selecting, by the central controller, one of the at least one neighboring subscriber units to produce a selected neighboring subscriber unit; and initiating, by the central controller, a call between the requesting subscriber unit and the selected neighboring subscriber unit.

16. The method of claim 12, wherein the registration information includes subscriber id, site affiliation, and affiliation status.

17. The method of claim 16 wherein the registration information further includes talkgroup id.

18. The method of claim 16 wherein the step of determining whether the at least one neighboring subscriber unit exists further includes the steps of:

searching the database for possible neighboring subscriber units based on the request;

reviewing affiliation status of registered subscriber units; and when the affiliation status of at least one of the registered subscriber units indicates a possible neighboring subscriber unit, identifying the possible neighboring subscriber unit as the at least one neighboring subscriber unit.

19. In a wide area communication system that includes a central controller, a plurality of sites, and a plurality of subscriber units each having a respective subscriber identification, a method for a requesting subscriber unit of the plurality of subscriber units to locate at least one neighboring subscriber unit, the method comprising the steps of:

transmitting, by the plurality of subscriber units, registration information to the central controller;

transmitting, by the requesting subscriber unit, a request to the central controller for a subscriber identification of at least one neighboring subscriber unit; and when the at least one neighboring subscriber unit exists, receiving, by the requesting subscriber unit from the central controller, the subscriber identification of the at least one neighboring subscriber unit.

20. The method of claim 19 further including the step of:

when the at least one neighboring subscriber unit does not exist, receiving, by the requesting subscriber unit from the central controller, information indicating that the at least one neighboring subscriber unit does not exist.

21. The method of claim 19 further including the steps of:

upon receipt of the subscriber identification of the at least one neighboring subscriber unit, selecting, by the requesting subscriber unit, one of the at least one neighboring subscriber units to produce a selected neighboring subscriber unit; and contacting, by the requesting subscriber unit, the selected neighboring subscriber unit.

22. The method of claim 19 wherein the request specifies identification of at least one neighboring subscriber unit having a site affiliation that substantially matches site affiliation of the requesting subscriber unit.

23. The method of claim 19 wherein the request specifies identification of at least one neighboring subscriber unit having a site affiliation that substantially matches site affiliation of the requesting subscriber unit or a site affiliation adjacent to the site affiliation of the requesting subscriber unit.

24. The method of claim 19, wherein the registration information includes subscriber id, site affiliation, and affiliation status.

25. The method of claim 24, wherein the registration information further includes talkgroup id.

26. The method of claim 25 wherein the request specifies identification of at least one neighboring subscriber unit having a specific talkgroup id.

27. The method of claim 25 wherein the request specifies identification of at least one neighboring subscriber unit having a talkgroup id that substantially matches one of a specific set of talkgroup ids.

* * * * *